Oct. 28, 1952 — L. L. JONES — 2,615,458
CAR TOP BOW-SUPPORTED TENT
Filed March 11, 1949 — 3 Sheets-Sheet 1
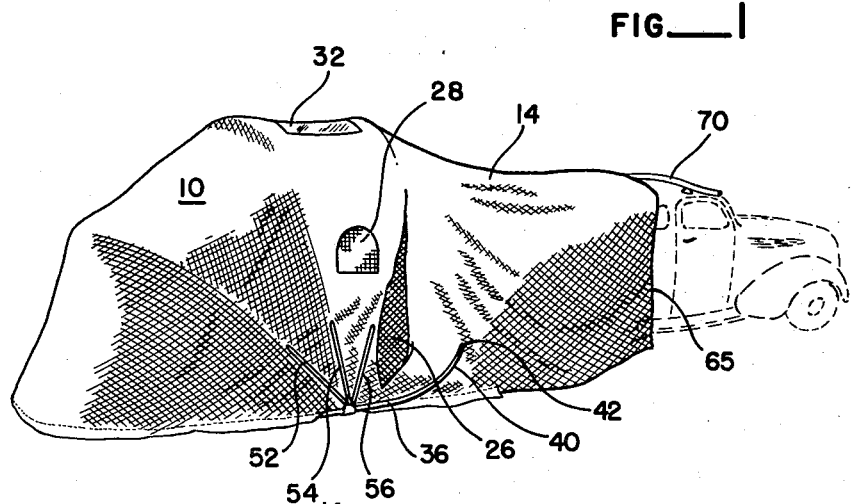
FIG. 1
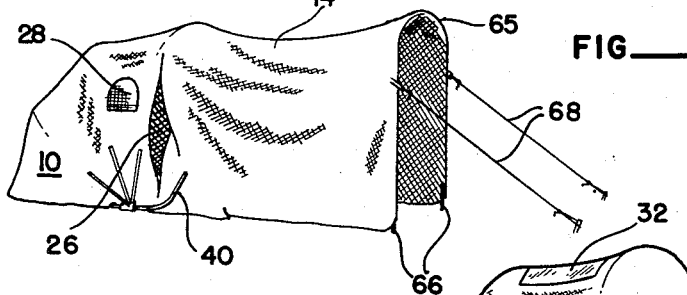
FIG. 2
FIG. 3
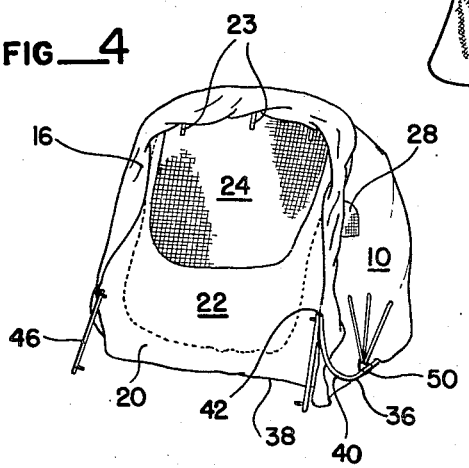
FIG. 4
LYMAN L. JONES
Inventor
By Smith & Tuck
Attorneys

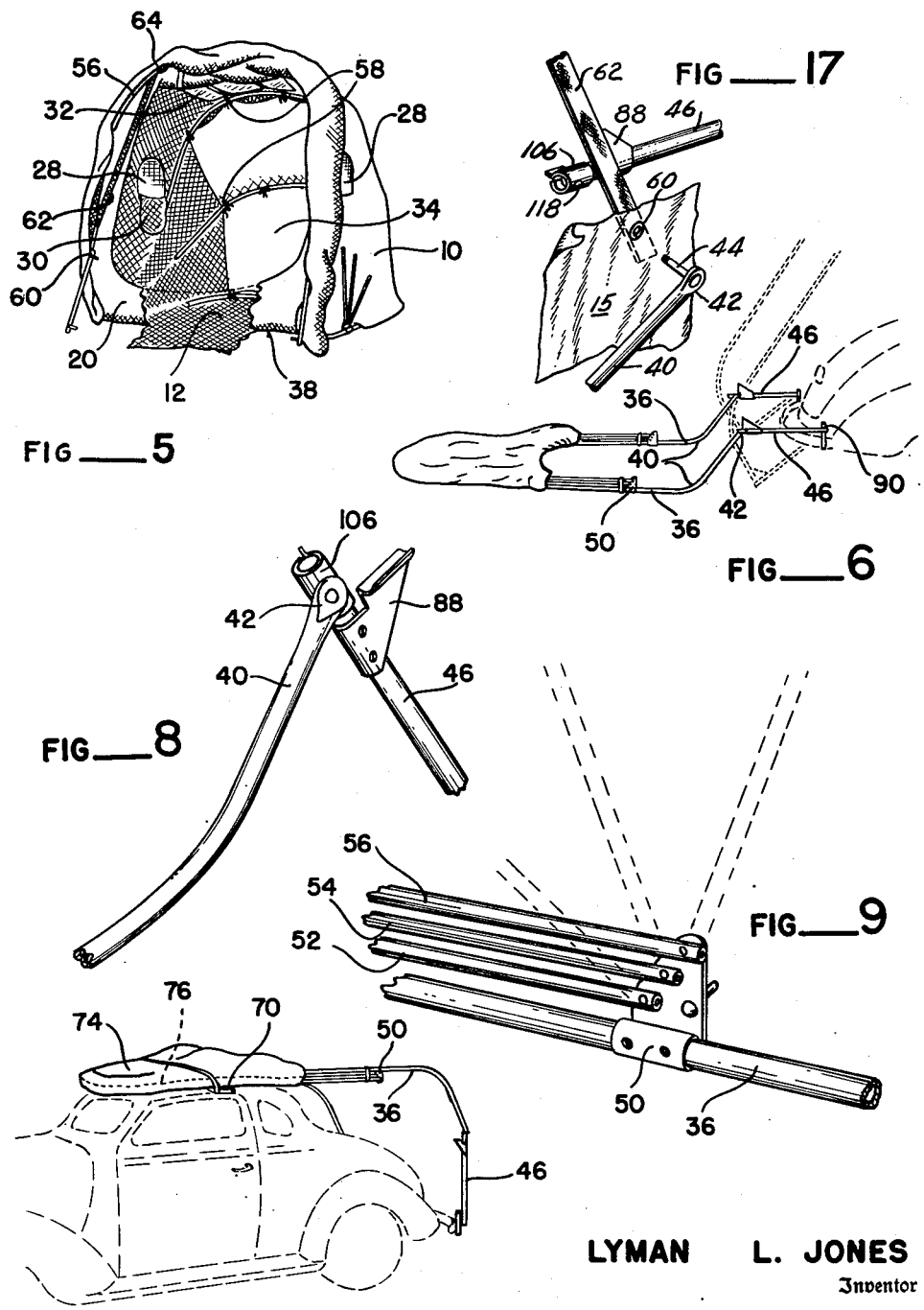

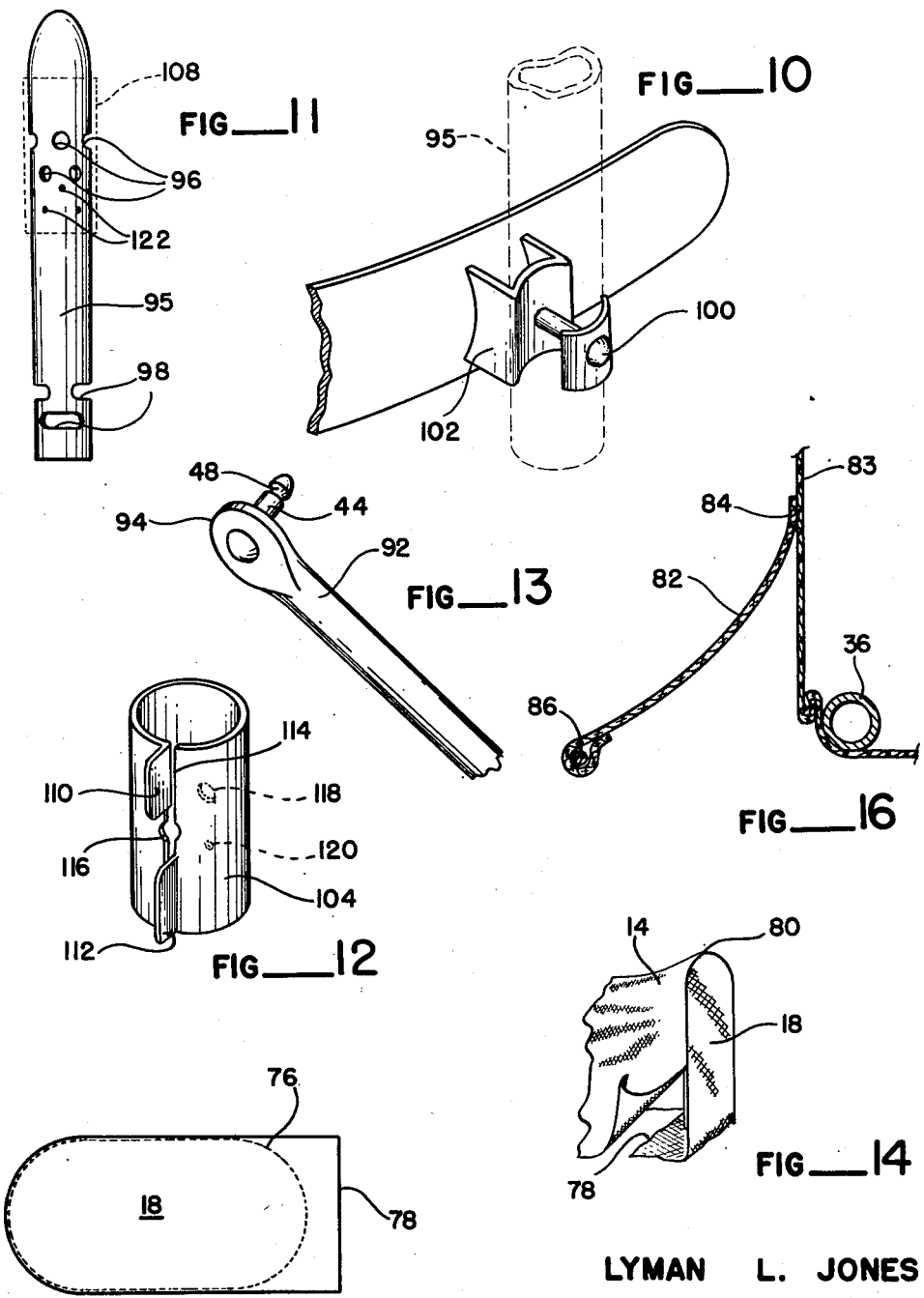

Patented Oct. 28, 1952

2,615,458

UNITED STATES PATENT OFFICE 2,615,458

CAR TOP BOW-SUPPORTED TENT

Lyman L. Jones, Seattle, Wash., assignor of one-half to George K. Barger, Seattle, Wash.

Application March 11, 1949, Serial No. 80,938

6 Claims. (Cl. 135—1)

My present invention relates to the general art of small tent construction and, more particularly, to a tent which is adapted for extension and support by the use of a plurality of hinged bow members. My construction is so arranged as to have the bows hingedly secured to an automobile at, or above, the rear bumper, with the bows in their folded position resting on the top of the car, together with the envelope forming the tent proper. On erecting the tent, the bows are hinged rearwardly and provide ground line, wall and roof supports for the tent.

The principal object of my invention, therefore, is to provide a tent structure which is hingedly attached at the rear of a car and from this point of attachment can be compactly carried on the roof of the car or unfolded and erected for occupancy.

A further object of the invention is to provide a tent which may be easily and quickly collapsed and folded into a neat and compact package, and which, when attached to the rear of an automobile, may be easily raised and swung over onto the roof of the automobile for transportation.

Another object of the invention is to provide linkage means whereby the folded tent, when being raised from the ground to a vertical position, will rotate about a pivot point essentially at ground level, and when lowering the tent from the vertical position to the roof of the car, the pivot point will be automatically transferred to a point some distance above the ground in the vicinity of the rear bumper of the car or vehicle.

A further object of the invention is to provide a camp shelter which, although being adapted to be attached to the rear of a vehicle, is completely self-supporting and may be used with all its intended convenience even in the absence of a vehicle.

Another object of the invention is to provide a camp shelter having comparatively bug-tight and snake-tight sleeping accommodations and, in addition, a sheltered area of ground wherein cooking, bathing, or other activities may be performed without the danger of defiling any portion of the tent structure by spillage of liquids or the like.

A further object of the invention is to provide an auto tent with a canopy which may be drawn down tightly over the top and sides of a vehicle in stormy weather so as to exclude rain or water from the rear luggage compartment of said car when the compartment is open.

A further object of the invention is to provide an auto tent having screened apertures for cross-ventilation which may be securely closed in stormy weather, and means for over-head illumination in the tent from a section of transparent material constituting a portion of the roof of said tent.

A further object of the invention is to provide a means for diverting rain or moisture away from the bottom edge of the tent wall.

An additional object of this invention is to provide a novel tent structure which may be fabricated in various combinations of its several components to effect a variety of models, to meet the desires of the trade, without any changes whatsoever in the patterns of said components, but merely by the omission or inclusion thereof.

A further object of this invention is to provide linkage means whereby the tent and car are relatively independent of each other in relation to the contour of the ground.

Further objects, advantages and capabilities will be apparent from the description and disclosure in the drawings, or may be comprehended or are inherent in the device.

In the drawings:

Figure 1 shows the tent as it would be used in conjunction with a car in stormy weather or for maximum privacy.

Figure 2 shows the tent in use with a bow in the end of the canopy and in the absence of a car.

Figure 3 shows the tent with the canopy partly collapsed as it might be used in windy weather in the absence of a car.

Figure 4 shows the tent with the canopy rolled back to show the inner partition.

Figure 5 shows the same view as Figure 4 with the partition rolled up, and a cut-away section for better illustration of the interior.

Figure 6 shows the tent collapsed and folded up as it lies at the rear of the car.

Figure 7 shows the tent being carried on the roof of a coupe.

Figure 8 shows a detail of the hinge point between the linkage member and the primary bow.

Figure 9 shows details of the manner in which the three secondary bows are hingedly supported by the primary bow.

Figure 10 shows a detail of the cradle clamp which holds the anchor post to the rear bumper of the car.

Figure 11 shows details of one type of anchor post.

Figure 12 shows details of the clip on the anchor post for holding the hinge-pin of the primary bow or one of the linkage members.

Figure 13 shows a detail which may be the end of either a primary bow or a linkage member.

Figure 14 shows the end of the canopy when covered by the envelope used to enclose the folded tent when in transit.

Figure 15 shows details of the envelope which encloses the tent while in transit, and may be used to close the end of the canopy as shown in Figure 14.

Figure 16 shows a cross-section of the tent wall attached to the floor, the primary bow within the tent, and the attached rain skirt for deflecting the rain outwardly from the tent floor.

Figure 17 shows an enlarged view of the wall section 15 taken from the side wall of the canopy 14 in Figure 1.

The sleeping compartment enclosure of my tent structure consists of a canvas covered portion 10 shown in Figures 1 through 5 inclusive. This sleeping compartment is provided with a floor 12, shown in Figure 5. A canopy portion 14, shown in Figures 1, 2 and 3, is fastened to the sleeping compartment 10 and may be used to cover the back of the car, as in Figure 1, to shelter an area of ground where cooking, bathing or other activities may be performed, as in Figure 2, or in stormy weather it may be partly collapsed as shown in Figure 3 to reduce its wind resistance and to afford a small area of covered ground for the storage of dunnage or the like. In addition, the canopy may be rolled back as shown at 16 in Figure 4. Furthermore, in cold weather provision has been made for closing the end of the canopy 14 by means of an attachable piece of fabric shown at 18 in Figures 14 and 15. This piece of fabric 18 may also serve as an envelope for enclosing the tent when folded and carried on top of the car.

The canopy and sleeping compartment are separated by a partition 20 as shown in Figures 4 and 5. The partition 20 is provided with a zippered door 22, shown closed in Figure 4 and open in Figure 5. When unzippered, the door 22 hangs down as a flap and may be rolled up toward the ceiling where straps 23 are provided to fasten it out of the way. Two zipper sliders are provided on this door 22 so that it may be opened from either edge and, in addition, said sliders are provided with snaps to lock them closed from the inside of the sleeping compartment. Each zipper has a pull tape on each side so that the door 22 may be opened or closed from either the sleeping compartment or the canopy portion, provided, of course, that the sliders are not locked closed. In addition, the partition 20 also has a screened area for ventilation as shown at 24, Figure 4. A flap is provided to close the screened area 24 from within the sleeping compartment 10. The flap for closing the screened area 24 may be rolled up and held out of the way by straps provided in the same manner as is the door 22. The side walls and roof of the sleeping compartment 10, in conjunction with its floor 12 and the partition 20, combine to make a bug-tight sleeping compartment. Access to the sleeping compartment 10 from outside is accomplished by means of a vertical zippered slot 26 shown in Figures 1, 2 and 3. This door 26 has two sliders so that an adult may open the door from the top, or a child may open the door from the bottom. Each slider is adapted to be operated from either the inside or outside of the tent and has snaps provided for locking from the inside.

To provide additional ventilation and a view of the outside, the sleeping compartment 10 is provided with two screened windows, one on each side, shown at 28 in Figures 1 through 5, inclusive. These windows 28 may be closed by flaps, one of which is shown at 30 in Figure 5 as it hangs down, leaving the window 28 open. Each flap is securely closed by means of a zipper having two sliders thereon. When said sliders are together at the top of the arc of window 28, the window is closed and any desired opening may be obtained by pulling the zipper sliders apart and sliding them down either side of the window opening. To provide greater illumination within the tent during daylight hours, a translucent sheet of Vinylite plastic or the like has been included as an insert in the roof at 32, Figures 1 and 5. To provide greater light reflectivity of the interior of the tent, a white cloth liner has been provided as shown at 34 in Figure 5. This liner 34 is held in place by means of tie-tapes and may be easily removed for washing in a matter of moments without dismantling the tent in any way.

A framework of light-weight aluminum U-shaped bows is provided for the support of the canvas covering of the sleeping compartment 10. A primary bow 36, shown in Figures 1, 3, 4, 6, 7, and 9, outlines the floor area of the sleeping compartment except for that edge of the floor area shown at 38, Figures 4 and 5. This primary bow 36 is longer and generally made heavier than the other bows since it carries greater loads. The outer ends of the legs or extremities 40 of the primary bow 36 are bent upward as shown at 40, Figures 1, 2, 4 and 8. This curvature of the primary bow 36 serves a number of useful purposes as will become obvious. The upper end of this curved portion indicated at 42, Figures 1, 4, 6 and 8, is provided with a hinge-pin 44 as shown in Figure 13. These two hinge-pins 44 protrude inwardly, pointing toward each other and, hence, are coaxially aligned. These pins serve as a hinge point in conjunction with the linkage members, shown at 46, Figures 4, 6, 7 and 8. Each hinge-pin 44 has an annular groove 48 around its periphery and near its rounded protruding end as shown in Figure 13. A clip or bracket 50, Figures 4, 6, 7 and 9, is fastened to the primary bow 36 to serve as a hinge point for the three secondary bows 52, 54, and 56, shown in Figures 1 and 9.

The three secondary bows are shorter and generally of smaller diameter than the primary bow since they carry less load. The secondary bows 52, 54, and 56 are all of approximately the same length and the clip 50, Figure 9, is fastened to the primary bow 36 at such a point that the secondary bows, when folded down as shown by the solid lines in Figure 9, will stack up approximately above the primary bow 36. As a matter of economy in manufacture and simplicity of design, no attempt has been made to determine the angular spacing between the bows when the tent is erected other than having the bows fastened to the interior surface of the tent by means of tie-tapes, or the like, shown in Figure 5 at 58. The sleeping compartment portion 10 is made self-supporting upon being pulled erect, by virtue of a strain member 62 shown in Figure 5, and in enlarged detail in Figure 17. The strain member or stay 62 is fastened at its upper end to the secondary bow 56 at the point 64 in Figure 5. The lower end of strain member 62 is sewed to the inside of the tent wall and a grommet 60 is riveted through both the tent wall and the strain member 62. Figure 17 shows an enlarged view of the wall section 15 taken from the side wall of the canopy 14 in Figure 1. It will be noted in Figures 1 and 2 that the linkage members 46 are not shown because they are inside the canopy and hence they are not visible from the outside when the tent is erected. Therefore, upon pulling the tent upward to erect same from the collapsed position shown in Figure 6, it becomes necessary to momentarily disconnect the linkage members 46 from the primary bow 36 at the hinge-point 42. Figure 17 shows how that portion 15 of the canopy wall is brought into position inside of the leg 40 of the primary bow 36 and outside of the linkage member 46. The grommet 60 is then slipped over the pin 44, thus placing the pin 44 inside of the canopy. The linkage member 46 is then reconnected to the primary bow by pushing the pin 44 through the hole 118 in the end of the linkage member 46 until the pin locks in place. One of these strain members 62 is, of course, provided on each side of the tent.

The canopy portion 14, Figure 2, for simplicity of design and economy of manufacture, has not been made self-supporting. At its outer end a wide hem 65 has been provided to receive a loose bow, the ends of which are shown at 66, Figure 2. Cords 68 provided may be tied to stakes as shown in Figure 2 to hold the canopy 14 erect in the absence of a car. In case the rear of a car is left in the canopy 14, Figure 2, the two cords 68 may be tied to the protruding ends of the cross-bar rack shown at 70, Figures 1 and 7. During stormy weather the loose bow 66, Figure 2, may be quickly and easily withdrawn from the hem 65, and a loose cord or rope also provided within the hem 65 may be used to shirr the tent down around the car body. The ends of said cord may then be fastened to hooks engaging the lower edge of the car or to stakes driven in the ground, or by other means, as shown in Figure 1. In Figure 3, wherein the tent is shown with the canopy 14 partially collapsed, the loose bow 66 has been left in the hem 65. Tape loops 72, Figure 3, permit staking down the outer end of the canopy. This provides a covered area for storing dunnage or the like outside of the sleeping compartment.

The cross-bar rack mentioned above is shown at 70 in Figures 1 and 7, and serves as a rack to hold the tent in its packaged form on the roof of the car while in transit. The bar 70 has a slight curve to conform to the curvature of the roof and is equipped with rubber cup feet to avoid marking the finish of the car. In addition, straps and gutter hooks are provided to securely fasten it to the car. No detailed drawing has been shown since its design is unimportant. In fact, some types of ski-racks now on the market could be adapted to this use. As shown in Figure 7, when in transit or in its folded condition on top of the car, the tent package 74 rests on the cross-bar rack 70, the ends of which protrude slightly beyond the tent in width. A strap, webbing or cord is then securely fastened to the protruding ends of the bar 70 and cinched down tightly over the tent package to keep it in place.

A piece of canvas or suitable fabric 18, Figure 15, is provided as an envelope to cover the folded tent when in transit on top of the car, as shown at 74, Figure 7. The piece of fabric 18, Figure 15, is provided with a zipper as shown at 76 in the same figure. When the piece 18 is folded as indicated in Figure 15 and the corners and excess 78 are tucked inside, the zipper 76 will close the sides and the curved end to form a pouch, enclosing the folded canvas portion of the tent. This same piece of fabric 18 as mentioned before is used to close the outer end of the canopy 14, Figure 14, by means of attaching the zipper around its curved end to a corresponding strip of zipper around the curved portion of the canopy at 80, Figure 14. The rectangular end 78, Figure 15, hangs down to, and lies partly on, the ground as shown at 78 in Figure 14, thus helping to make a tight closure.

To prevent rain water, moisture, or the like, from running down the outside of the tent and creeping under the floor, a rain skirt 82, Figure 16, has been devised. The rain skirt 82, Figure 16, is fastened to the tent wall 83 as at 84, same figure, and extends outward and downward at an angle ending in a hem containing a cord or rope to form a firm edge as at 86.

It will be noted that in the several views of the sleeping compartment 10, the primary and secondary bows pass through the tent walls at a point some distance out from the hinge-point bracket 50, Figures 4 and 6. This is a very necessary feature in order that the side walls, partition, and floor may be folded away from the car and toward the rounded end of the bows in Figure 6 so that a shorter and more compact package may be obtained which can be carried on the roof of the car without obscuring the rear view. Tie-tapes or other means of fastening, at the point where the bows go through the side walls, hold the tent fabric firmly to the bows at these points. Slots are also provided in the wide hem 65, Figure 2, to allow the ends of the loose bow 66 to pass out through the fabric at a point corresponding to the point at which the primary and secondary bows pass through the tent wall in order that the lower portion of the canopy 14 may be folded back as are the floor, partition, etc., for a smaller package. In Figure 2, however, the loose bow 66 is shown in the hem 65 for the full length of said hem for the purpose of keeping the lower edges of canopy 14 taut when the tent is erected as shown in this figure.

In its folded form, as shown in Figure 6, and with the envelope enclosing the folded tent, the whole is ready to be swung over to the top of the car. As the tent package is raised from the ground the upwardly curved portions 40 of the primary bow 36 remain on the ground and act as rockers, thus swinging the linkage members 46 in a downward arc until the hinge points 42 contact the ground as shown in dashed lines in Figure 6. By this action, the fulcrum point is kept as low as possible at all times during the raising of the tent, thereby making it much easier to handle same. Somewhat beyond the vertical position in the direction of the car, depending upon the angles involved, height of the car bumper, etc., those portions of the primary bow designated as 40 engage the stops 88 on the linkage members 46, as shown in dashed lines, Figure 6. More detail of the stop 88 and the linkage member 46 to which it is attached is shown in Figure 8, although the section 40 of the primary bow is not shown engaging the stop 88 in this figure. After the stops 88 prevent further rotation of the primary bow toward the car about the point 42, rotation toward the car then takes place about the hinge point 90, Figure 6. The hinge point 90, Figure 6, consists of a pin and hole combination almost identical to the hinge point 42 at the opposite end of the linkage member 46. Figures 6 and 8. The pin portion of the hinge points 42 and 90 is shown in Figure 13, wherein the pin 44 has a groove 48 near its rounded end as cited above, and the member 92 with the flattened end 94, in which is fastened the pin 44, may represent either the extremities of the primary bow or the pin end of the linkage members 46, since they are made identical. The linkage members 46 are designed with a pin at the hinge point 90 and a hole at hinge point 42, Figure 6. This makes it possible, if so desired, to remove the linkage members 46 entirely and to insert the hinge-pins in the ends of the primary bow directly in the hinge holes at the hinge point 90.

The hinge point 90 is in the upper end of an anchor post shown in detail in Figure 11. In Figure 11, the holes 96 are made to receive the hinge-pin 44, shown in Figure 13. The slotted holes 98 at the bottom of the anchor post 95 are designed to take a bolt as shown at 100 in Figure 10, and by virtue of the slot, allow approximately 45 degrees of axial rotation in the cradle 102, Figure 10. Since the curvature in the horizontal plane varies considerably with different makes of cars and different styles of bumpers, the axial rotation of the anchor post 95, plus a choice of hinge holes 96, at each 45 degrees around the anchor post 95, allows a combination of adjustments sufficient to obtain coaxial alignment of the hinge holes in one anchor post with that of the other on the opposite end of the bumper.

To firmly lock the hinge-pins in the hinge holes in both the linkage members 46 and the anchor post 95, to allow relatively free rotation of said pin in the holes and yet to allow quick and easy removal of the pins from said holes, a locking ferrule 104 was designed as shown in Figure 12. The ferrule 104, Figure 12, is made of resilient material, preferably metal, and designed to almost completely surround the linkage member 46 as shown at 106 in Figure 8. The ferrule 104 is formed so as to contract itself tightly about the enclosed member, such as the anchor post, and has two outwardly protruding ears 110 and 112, Figure 12. It will be noticed in Figure 12 that the ear, or lug, 110 is on the opposite side of the slot 114 relative the lug 112. Therefore, it will be observed that if a counter-clockwise twisting motion centered about the hole 116 be applied to the lugs 110 and 112, the slot 114 will tend to open, provided the ferrule 104 is prevented from turning. In other words, the force applied to the ears, as described above, causes the ferrule 104 to expand, thus effectively enlarging the hole 116. The hole 118 in dashed lines in Figure 12 is made large enough to receive the full diameter of the pin 44, Figure 13, while the hole 116 corresponds in size to the reduced diameter 48 of pin 44 in Figure 13. The hinge hole in the linkage member 46 at the hinge point 42, Figure 8, and similar holes 96 in the anchor post 95, Figure 11, are, of course, made large enough to receive the full diameter of the pin 44 in Figure 13. For simplicity, only the springy locking ferrule 104 is shown in Figure 12 and whatever element it may surround, such as the anchor post 95, Figure 11, or the linkage member 46, Figure 8, has been omitted. The locking ferrule functions as follows: as the rounded end of the pin 44 is inserted through the hole 118 on the far side of the ferrule 104, in Figure 12, and pushed through the hinge holes in the omitted element, said pin 44 approaches the hole 116, and the rounded end of said pin pushes through, thereby spreading open the slot 114 until the hole 116 is large enough to pass the full diameter of the pin 44. Upon being pushed still further, the pin 44 progresses until the edges of the ferrule surrounding the hole 116 snap into the annular groove 48 on the pin 44. The above action has now locked the pin 44 in place and it cannot be withdrawn until the lugs 110 and 112 are grasped by the fingers of one hand and twisted counter-clockwise to spread the slot 114, thereby disengaging the edges of the hole 116 from the annular groove 48 in the pin 44, Figures 12 and 13. To retain the ferrule 104 in its proper position on the element which it surrounds, it is fastened to its enclosed element by means of a single screw through a hole 120 which is diametrically opposite its slot 114 in Figure 12. To allow the ferrule to be positioned over any one of the desired hinge holes 96 in Figure 11, a series of threaded holes 122 are appropriately placed in the anchor post 95 to receive the screw for fastening the ferrule indicated at 108, same figure.

It should now be obvious that a variety of modified forms of the invention may be obtained by the inclusion or omission of a number of its elements, without departing from the basic concept involved. For example, the floor and partition could be omitted for those desiring a larger expanse of uninterrupted ground area and who are not concerned with the tent being bug-tight. For a more economical model, the translucent section of material in the roof could be eliminated. Furthermore, if the simplest form was desired in order to save weight and reduce cost of manufacture, the floor and canopy could be dispensed with and a solid partition without a door or screen could be used to close the end of the sleeping compartment. Such a simplified model would still afford very effective shelter against rain and wind, and could be more easily handled by a single individual.

From the above it will be seen that I have provided a tent structure having great flexibility as to application, which can be easily and quickly erected by a single individual and which, when set up, gives ample head-room inside, is well stayed against the elements, and the structure provided is so arranged that it can be readily attached to the rear portion of a motor vehicle and fastened securely on the roof for transportation.

While I have disclosed a specific collapsible frame tent, it is to be understood that other variations are considered within the scope of this invention which, in its broadest aspect, comprises a framed tent which is readily collapsible for transportation on the exterior of a motor vehicle or other conveyance.

While but a single specific embodiment of my invention is herein disclosed, it is to be considered as illustrative only, and not restrictive, the scope of the invention being defined in the subjoined claims.

What I claim as my invention is:

1. A collapsible and portable shelter, comprising: a collapsible, skeletal, supporting structure comprising a primary U-shaped bow and a plurality of secondary U-shaped bows; said secondary bows having the ends of their legs hingedly connected to the legs of said primary bow; flexible sheet material means forming a distensible enclosure; said skeletal structure being adapted to be disposed in supporting and distending relation to said enclosure; fastening means securing said primary and secondary bows to said enclosure; a pair of anchor posts adapted to be attached to a vehicle; linkage pivotally connecting the legs of said primary bow to said anchor posts; stop means limiting pivotal rotation of said primary bow with respect to said linkage to less than 360 degrees of arc; strain members adapted to connect the pivotal ends of said primary bow to portions of the adjacent secondary bow when the shelter is erected; a tunnel-shaped canopy of flexible sheet material attached to said enclosure to provide additional ground shelter; and a partition of flexible sheet material separating said canopy portion from said enclosure portion.

2. A collapsible and portable shelter, comprising: a collapsible, skeletal structure comprising a primary U-shaped bow and a plurality of secondary U-shaped bows; said secondary bows having the ends of their legs hingedly connected to the legs of said primary bow; flexible sheet material means forming an enclosure; at least a part of said skeletal structure being suitably disposed without said enclosure; fastening means securing said primary and secondary bows to said enclosure; a pair of anchor posts adapted to be attached to a vehicle; the legs of said primary bow being hingedly connected to said anchor posts; a tunnel-shaped canopy of flexible sheet material attached to said enclosure to provide additional ground shelter; and a cord adapted to shirr the free end of said canopy about the body of a vehicle.

3. A collapsible and portable shelter, comprising: a collapsible, skeletal, supporting structure comprising a primary U-shaped bow and a plurality of secondary U-shaped bows; said secondary bows having the ends of their legs hingedly connected to the legs of said primary bow; flexible sheet material means forming a distensible enclosure; said skeletal structure being adapted to be disposed in supporting and distending relation to said enclosure; fastening means securing said primary and secondary bows to said enclosure; a tunnel-shaped canopy of flexible sheet material attached to said enclosure to provide additional ground shelter; a loose, removable, U-shaped bow supporting the free end of said canopy; and flexible sheet material means attachable to the free end of said canopy for closure of same.

4. A collapsible and portable shelter, comprising: a collapsible, skeletal structure comprising a primary U-shaped bow and a plurality of secondary U-shaped bows; said secondary bows having the ends of their legs hingedly connected to the legs of said primary bow; flexible sheet material means forming an enclosure; a first part of said skeletal structure including the arched mid-portions of said U-shaped bows being suitably disposed within said enclosure; a second part of said skeletal structure including the juncture of the legs of said bows being suitably disposed without said enclosure; a tunnel-shaped canopy of flexible sheet material attached to said enclosure to provide additional ground shelter; a loose, removable, U-shaped bow supporting the free end of said canopy; and a partition of flexible sheet material separating said canopy portion from said enclosure portion.

5. A collapsible and portable shelter, comprising: a collapsible, skeletal structure comprising a primary U-shaped bow and a plurality of secondary U-shaped bows; said secondary bows having the ends of their legs hingedly connected to the legs of said primary bow; flexible sheet material means forming an enclosure; a first part of said skeletal structure including the arched mid-portions of said U-shaped bows being suitably disposed within said enclosure; and a second part of said skeletal structure including the juncture of the legs of said bows being suitably disposed without said enclosure.

6. A collapsible and portable shelter, comprising: a collapsible, skeletal structure comprising a primary U-shaped bow and a plurality of secondary U-shaped bows; said secondary bows having the ends of their legs hingedly connected to the legs of said primary bow; flexible sheet material means forming an enclosure; said skeletal structure being disposed in supporting and distending relation to said enclosure; and at least a part of said skeletal structure being disposed without said enclosure.

LYMAN L. JONES.

REFERENCES CITED

The following references are of record in the file of this patent:

UNITED STATES PATENTS

| Number | Name | Date |
|---|---|---|
| 1,394,579 | Purcell | Oct. 25, 1921 |
| 1,745,264 | Margot et al. | Jan. 28, 1930 |
| 1,966,023 | Will | July 10, 1934 |
| 2,299,382 | Creasy | Oct. 20, 1942 |